United States Patent [19]
DeSmet

[11] Patent Number: 4,884,974
[45] Date of Patent: Dec. 5, 1989

[54] INTERACTIVE TALKING BOOK AND AUDIO PLAYER ASSEMBLY

[75] Inventor: Eric DeSmet, Sint Niklaas, Belgium

[73] Assignee: View-Master Ideal Group, Inc., New York, N.Y.

[21] Appl. No.: 135,739

[22] Filed: Dec. 21, 1987

[51] Int. Cl.$^4$ ............................................. G09F 27/00
[52] U.S. Cl. .................................... 434/317; 434/178; 434/335
[58] Field of Search ............... 434/317, 316, 315, 335, 434/311, 178

[56] References Cited

U.S. PATENT DOCUMENTS

| | | | |
|---|---|---|---|
| 2,945,307 | 7/1960 | Kallmann | 434/311 |
| 3,964,188 | 6/1976 | Dimitracopoulos | 434/317 |
| 4,021,932 | 5/1977 | Lipps | 434/317 |
| 4,355,984 | 10/1986 | Slavik et al. | 434/335 |
| 4,498,870 | 2/1985 | Madonna | 434/335 |
| 4,636,881 | 1/1987 | Brefka et al. | 434/317 |
| 4,703,573 | 11/1987 | Montgomery et al. | 434/317 |
| 4,725,230 | 6/1988 | Shimizu | 434/317 |
| 4,778,391 | 10/1988 | Weiner | 434/317 |
| 9,425,099 | 1/1984 | Naden | 434/335 |

OTHER PUBLICATIONS

IBM Technical Disclosure, "Educational Apparatus with Workbook", Davidge et al., 1968.

Primary Examiner—Leo P. Picard
Assistant Examiner—Jessica J. Harrison
Attorney, Agent, or Firm—Michael Ebert

[57] ABSTRACT

An interactive talking book and audio player assembly, the back cover of the book having an ROM module attached to its end margin in which is stored digitally recorded spoken texts corresponding to texts printed on pages of the book. Printed on the end margin of each book page that carries a printed text is a page-identifying binary bar code formed by reflective and non-reflective elements. Associated with the book is an audio player having a base inlet adapted to receive the end margin of the back cover and to bring the terminals of the ROM module into engagement with inlet contacts connecting the module to a speech unit for converting the digitally-recorded texts into audio signals which are amplified and reproduced. When the pages of the book are turned, they overlie the base inlet of the player, the bar code on the open page being then exposed to ambient light. The code elements in the code which are reflective direct the light toward an array of light sensors mounted above the inlet and those which are non-reflective do not, to produce binary signals indentifying the open page. The page-identifying signals are applied to a sensor interface and are transferred thereby to the speech unit which then acts to read-out from the ROM module the spoken text corresponding to the printed text on the open page whereby the reader of this text hears what he is reading.

14 Claims, 3 Drawing Sheets

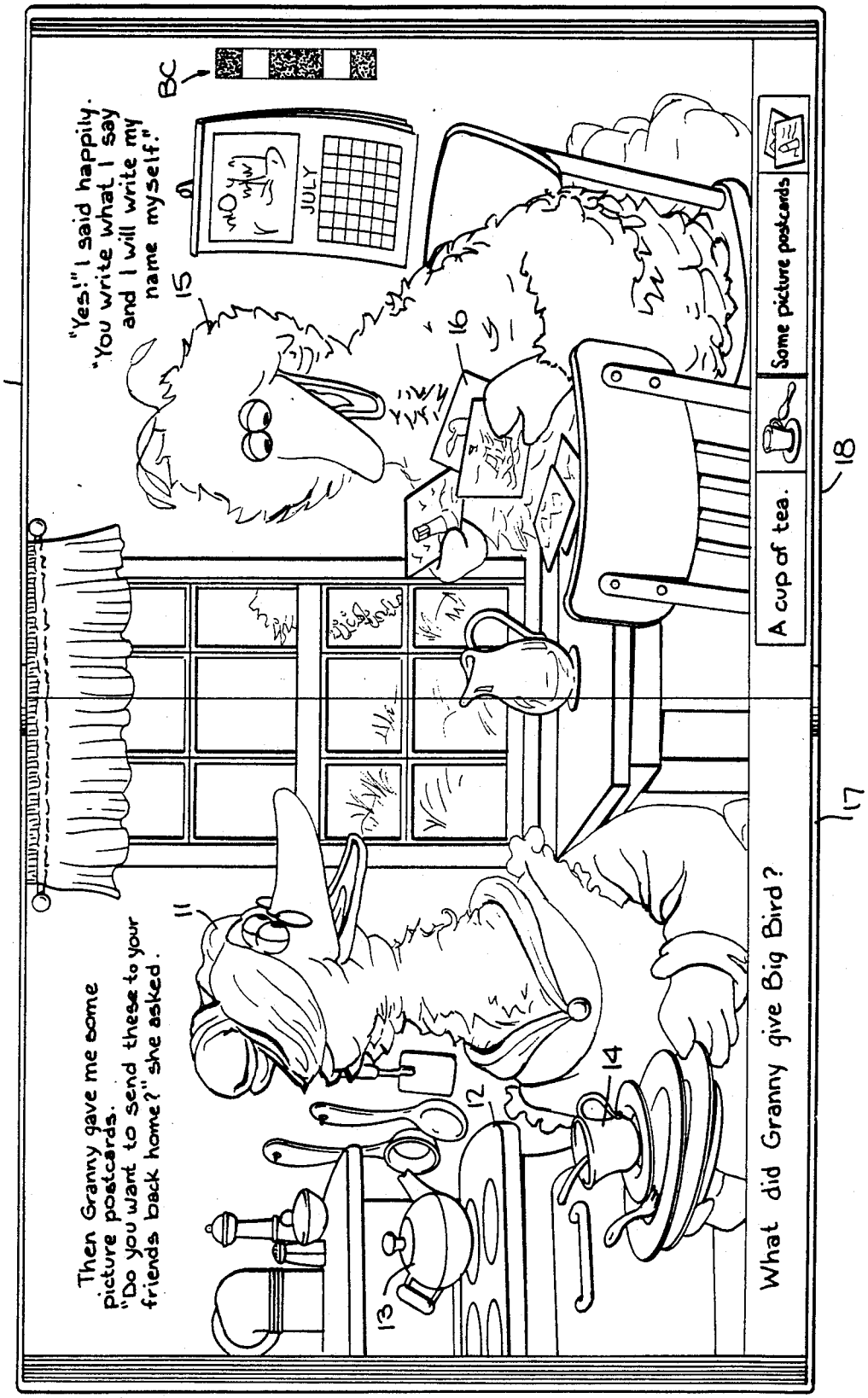

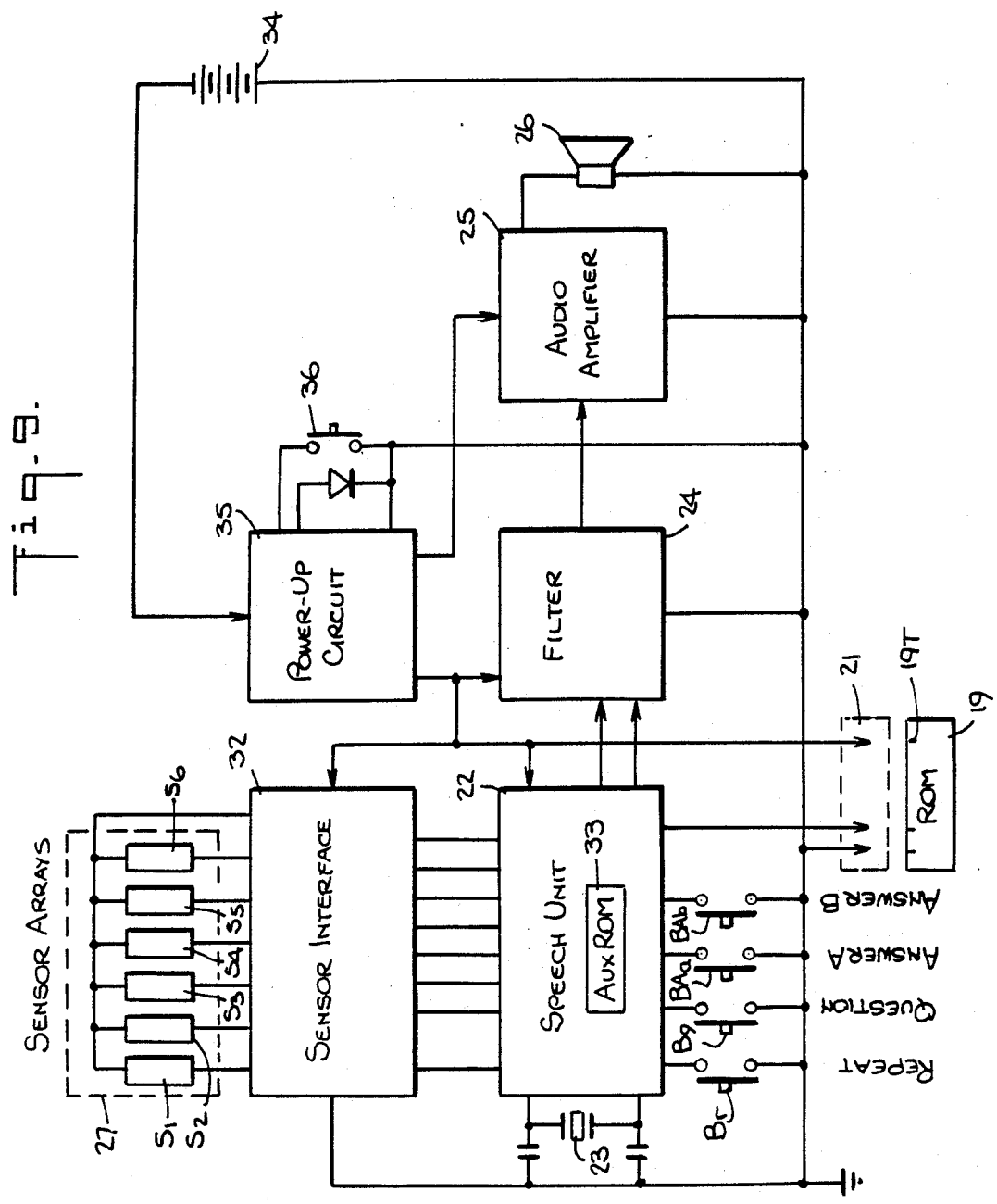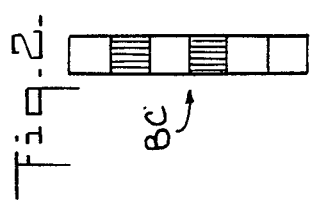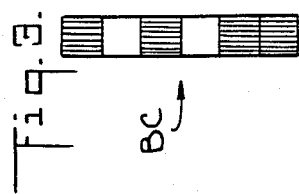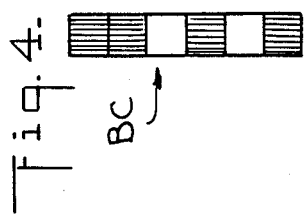

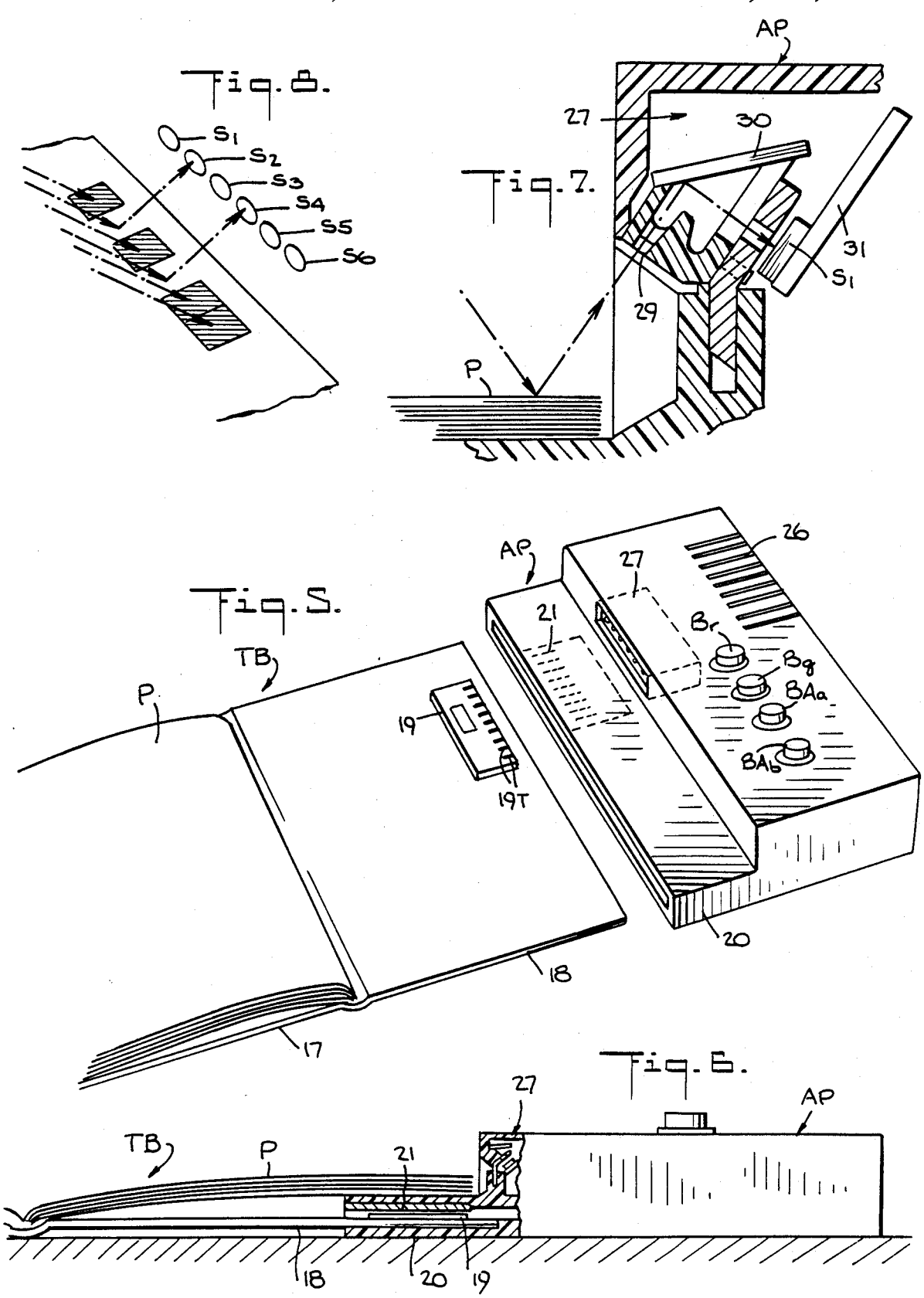

INTERACTIVE TALKING BOOK AND AUDIO PLAYER ASSEMBLY

BACKGROUND OF INVENTION

1. Field of Invention

This invention relates generally to talking books having entertainment and educational value, and more particularly to an interactive talking book and audio player assembly in which the text printed on the page of a book open to the reader is read aloud, the spoken text being digitally recorded and stored in a ROM module secured to the back cover of the book, the player being also adapted to read aloud a question printed on the page related to the printed text, and to indicate whether the reader who selects a right or wrong answer printed on the page made the right choice.

2. Status of Prior Art

Educators recognize that the ability of a child to learn to read well is directly related to the number of faculties a child is called upon to exercise during the learning process. Thus when a child looks at the words of a text as the words are read aloud to him, this learning technique coordinates sight word recognition with phonetics and proper pronunciation. And if the printed text of the book is accompanied by drawings or pictures which illustrate the text, these illustrations facilitate comprehension of the printed text.

But it is not enough for a child to learn to read the words of a printed text and to know how these words sound, for it is fully as important that the child understand the meaning of the text. To promote such understanding, it is necessary to interrogate the child to see whether he has grasped the meaning of the text he has read.

Thus computerized interactive teaching machines are known which present on the screen of a display terminal a printed text providing the reader with certain information to be learned. After reading this text, the reader then presses a button which causes the screen to present a question relating to the information and at least two possible answers thereto, only one of which is correct. By pressing an answer button, the reader indicates his choice for an answer, and the machine then indicates whether the reader has selected the correct answer. Such teaching machines, while of significant educational value, are relatively complex and expensive, and beyond the reach of most consumers. Moreover, they do not facilitate the acquisition of reading skills in that the printed text is not reproduced as a spoken text.

It is also known to provide talking books which include means to reproduce the printed text as spoken messages. Thus Glass et al. U.S. Pat. No. 3,540,132 discloses an audio-visual educational device for children constituted by a book and a phonograph mechanism, with phonograph records bearing messages pertinent to the book in sequential order to the pages of the book. The phonograph includes a switch mechanism on the supporting surface of the book for actuating the record mechanism for a cycle of operation corresponding to a limited portion of the book. As the pages of the book are turned, the switch is again actuated to play a subsequent portion of the record corresponding to a subsequent portion of the book.

The Ross U.S. Pat. No. 4,273,538 discloses an educational aid to teach reading which takes the form of a book having lines of printed text and sound recordings of the text on associated magnetic strips. A magnetic pickup is drawn manually or by a spring mechanism along the magnetic strips to play back the recordings.

In Goetz et al. U.S. Pat. No. 3,529,832, a book is disclosed which is associated with a phonograph adapted to play recorded messages corresponding to printed matter on each page of the book. In U.S. Pat. No. 4,425,098, a sound-illustrated book is disclosed which includes sound record areas in the form of a spiral track associated with individual pages. U.S. Pat. No. 3,641,684 shows a teaching device for simultaneously teaching the reading and pronunciation of words, the device combining a housing which has the appearance of a book and a tape player within the housing, a replaceable pre-recorded tape and a printed book being detachably mounted on the housing. The text printed in the book corresponds to that recorded on the tape.

In Brefka et al. U.S. Pat. No. 4,636,881, a talking book is disclosed having front and back panels. A microcassette tape player and logical circuitry associated with left and right infrared detectors are located on top of the back panel. A ring binder is located at the left of the back panel adjacent the spline and below the left and right infrared detectors. A housing below the ring binder carries an infrared source that energizes the detectors which serve to identify the page being read. In this arrangement, the tape player carries recorded information related to the page being viewed that automatically starts when a page is turned.

Also of background interest in regard to talking books are Schwartz U.S. Pat. No. 3,352,027; Kantrowitz U.S. Pat. No. 3,086,297; Samuels U.S. Pat. No. 2,546,680; Folsom U.S. Pat. No. 3,744,150; Krainin U.S. Pat. No. 3,782,734, and Mayhew U.S. Pat. No. 1,236,333.

SUMMARY OF INVENTION

In view of the foregoing, the main object of this invention is to provide a talking book and audio player assembly making it possible for a reader of the book to hear a spoken text corresponding to the text printed on the page of the book being viewed, the audio player being separable from the book and being usable with other books of the same type having different texts printed thereon.

More specifically, an object of this invention is to provide an assembly of the above type in which the book includes a back cover having secured thereto a ROM module storing digitally recorded spoken texts corresponding to texts printed on pages of the book, whereby each book of the same type includes an ROM module whose digitally stored recording is appropriate to the printed text of the book.

A significant advantage of a talking book in accordance with the invention which includes a solid-state ROM module is that it does away with the need for tape recordings or phonographs of the type heretofore used in talking books, as well as the need for playback mechanisms required for such sound recordings, thereby effecting major economies in the production of talking books and simplifying their design. The talking book itself may be printed by conventional techniques, for no punch holes or other add-on expedients are required to identify the pages for purpose of sound playback.

Also an object of the invention is to provide an assembly of the above type which is interactive and which makes it possible for the reader not only to hear the printed text on the page being viewed, but to be questioned as to the meaning of the text and to indicate whether his answer is correct to be sure that the text is understood. Thus the user is supplied with talking books having both educational and entertainment value which facilitate his ability to read words, to pronounce those words and to comprehend their meaning.

Yet another object of the invention is to provide an assembly which may be mass produced at low cost.

An audio player in accordance with the invention is common to talking books of the same type and the user of the assembly may therefore acquire a library of such books, each telling a different story or containing educational material. Since the books are relatively inexpensive, this makes it possible for the user of the assembly to enlarge his library at low cost.

Briefly stated, these objects are attained in an interactive talking book and audio player assembly, the back cover of the book having an ROM module attached to its end margin in which is stored digitally recorded spoken texts corresponding to texts printed on pages of the book. Printed on the end margin of each book page that carries a printed text is a page-identifying binary bar code formed by reflective and non-reflective elements. Associated with the book is an audio player having a base inlet adapted to receive the end margin of the back cover and to bring the terminals of the ROM module into engagement with inlet contacts connecting the module to a speech unit for converting the digitally-recorded texts into audio signals which are amplified and reproduced. When the pages of the book are turned, they overlie the base inlet of the player, the bar code on the open page being then exposed to ambient light. The code elements in the code which are reflective direct the light toward an array of light sensors mounted above the inlet and those which are non-reflective do not, to produce binary signals identifying the open page. The page-identifying signals are applied to a sensor interface and are transferred thereby to the speech unit which then acts to read-out from the ROM module the spoken text corresponding to the printed text on the open page whereby the reader of this text hears what he is reading. Also printed on pages of the book is a question relating to the printed text as well as a right and wrong answer thereto. When the reader operates a question switch connected to the speech unit, he then hears the question, and when he operates either one of the two answer switches, he then hears whether the answer selected is correct.

BRIEF DESCRIPTION OF DRAWINGS

For a better understanding of the invention as well as other objects and further features thereof, reference is made to the following detailed description to be read in conjunction with the accompanying drawings, wherein:

FIG. 1 shows a double page from an interactive talking book included in an assembly in accordance with the invention, the book telling an illustrated story, a portion of whose text is printed on this page which also has printed on its end margin a binary bar code identifying the page;

FIG. 2 shows the bar code which identifies another page of the talking book;

FIG. 3 shows the page-identifying bar code for still another page;

FIG. 4 shows the page-identifying bar code for yet another page;

FIG. 5 shows, in perspective, an assembly in accordance with the invention constituted by a talking book and an audio player associated therewith;

FIG. 6 is a side view of the assembly when the back cover of the book is inserted in the base inlet of the player;

FIG. 7 illustrates the relationship of the light sensor array in the player with the bar code on the open page of the book;

FIG. 8 shows the optical effect of ambient light on a page-identifying bar code and the associated light sensor array; and FIG. 9 is a block diagram of the audio player.

DESCRIPTION OF INVENTION

The Talking Book:

FIG. 1 shows by way of example a double page 10 from an interactive talking book included in a book and audio player assembly in accordance with the invention. The audio player serves not only to read aloud the text printed on this page, but also makes it possible to interrogate the reader in regard to the printed text he has read to find out whether he has understood its meaning.

The book in this example tells a story involving characters "Granny Bird" and "Big Bird" taken from the well known educational TV series "Sesame Street." The double page shown in FIG. 1 illustrates on its left side Granny Bird 11 sitting next to a stove 12 on which a water kettle 13 is being heated to make tea, Granny Bird being shown holding a tea cup 14. Granny Bird 11 is facing and talking to Big Bird 15 illustrated on the right side of the double page. Big Bird is sitting at a table and is examining post cards 16.

The printed text of the left side of the page reads, "Then Granny gave me some picture post cards." Granny says to Big Bird, "Do you want to send these to your friends back home?"

The printed text on the right side gives Big Bird's reply, "Yes, you write what I say and I will write my name myself."

Printed along the end margin of the double page is a six bit binary bar code BC which identifies this page. This code is formed by a row of optical bits. Thus 010010 is represented by the illustrated black blocks which are non-reflective and therefore represent an "0," the reflective white spaces between these blocks representing "1"s.

Bar code BC, as will later be explained in greater detail, is optically sensed by an array of light sensors in the audio player associated with the book so that the audio player can identify the page being viewed by the reader and cause the player to read aloud the text printed on the double page, this text being a portion of the story told by the book.

Other pages containing different portions of the story are identified by different bar codes, such as those shown in FIGS. 2, 3 and 4, each identifying a respective page. Thus when the reader turns the double page shown in FIG. 1 and exposes to view another double page having an identifying bar code BC printed on its right end margin, the audio player will then read aloud the printed text on that double-page which represents another portion of the story.

After the child has read the text printed on the double page shown in FIG. 1 and heard this text spoken aloud by the audio player, he then must read the printed question which appears at the bottom of the left side of the double page in regard to this text: "What did Granny give Big Bird?" If now the child presses a question button or the audio player, he will hear this question read aloud.

The child is presented with two possible answers which are printed at the bottom of the right side of the double page. One possible answer, which is the wrong one, is "A cup of tea," this answer being illustrated by a cup. The other possible answer, which is the right one, is "Some picture post cards," this answer being illustrated by post cards. The two possible answers are printed on different color backgrounds, say, red and blue.

The audio player, in addition to a question button, is provided with two answer buttons whose colors match the colors of the printed answers. If, therefore, the child presses the red button to indicate that his answer is a cup of tea, the player will tell him "Your answer is wrong—try again" or an equivalent expression. But if the child presses the blue button, the player will announce, "Congratulations, your answer is correct. Now turn to the next page."

Thus the talking book is interactive and affords what is known in behaviorist psychology as "positive reinforcement," which is conducive to the learning process; for the child, if he performs well, is rewarded by being permitted to go on with the story. In short, in the process of reading the book, the child hears the text of what he is reading and in doing so is taught how the words he has read are pronounced as well as spelled, and the child is also interrogated as to the meaning of the text to be sure that he understands it.

An assembly in accordance with the invention is by no means limited in its applications to storybooks for children, for it can be used to teach foreign languages or other educational subjects where being able to hear as well as to read the printed text facilitates the learning process. However, it is not essential that the spoken messages which accompany the printed text correspond to the text, for in some instances it may be desirable that the spoken messages comment on the text or impart instructions to the reader.

And while in the example illustrated only two possible answers are given to each question relating to the printed text on the page, in practice one may provide multiple choice answers and an appropriate number of answer buttons.

The Assembly:

Referring now to FIG. 5, there is shown an assembly in accordance with the invention constituted by a talking book TB and an audio player AP associated with the book. This player is usable with any one of a library of talking books of the same type; that is, books which include a page-identifying bar code and an ROM module.

Book TB is provided with a hard front cover 17 and a hard back cover 18. Bound between these covers are pages P containing printed texts. Those pages whose printed texts are to be read aloud by the player have printed thereon a page-identifying bar code BC in the form shown in FIGS. 1 to 4. Securely nested in a depression formed at the end margin of back cover 19 is an ROM module 19 whose terminals 19T are exposed on the face of the module.

When back cover 18 is inserted in the flat base inlet 20 of audio player AP, whose dimensions are such as to accommodate this cover, the ROM terminals 19T are then engaged by corresponding inlet contacts which connect ROM module 19 to a speech unit in the player. In practice, the ROM module may be bonded or otherwise attached to the inner face of the back cover rather than nested therein.

A read only memory chip or ROM module is a solid-state, non-volatile memory, which once data is loaded into its discrete storage sites, the data stays therein even if power is shut off. It is known to use a ROM to store data in the form of words or speech messages. Thus in the ROM arrangement disclosed in the Shirf et al. U.S. Pat. No. 3,803,535, in order to load the ROM, spoken words are first analog recorded to produce an audio waveform which is then sampled at a high sampling rate. Each sample is digitized and stored as a binary value in a ROM site. In order to extract the stored words from the ROM and reconstruct the audio waveform, the stored digital values are read out from the ROM and fed in sequence as input signals to a digital-to-analog converter.

In the present invention, ROM module 19 attached to the back cover of the book is loaded with as many spoken messages as are required to record the printed text of the book, each message corresponding to that portion of the text which is printed on an identifiable page. Hence the page number is used to extract the spoken message related to the printed text on that page. Also stored in the ROM are spoken messages corresponding to printed questions on the pages of the book, each question message being accessible by way of the number of the page carrying the printed question.

Message extraction from a ROM, as explained in the Shirf et al. patent, is effected by a start-of-message signal which is applied to an electronic clock, such as an electronic oscillator, which then generates a train of periodic pulses. These clock pulses are applied to a counter that causes the memory sites in the ROM where the digitized samples of the message are stored, to be read out in sequence.

The digitized sample signals yielded by the ROM are applied to a D-to-A converter whose output is a stepped analog waveform. This is applied to a low-pass filter to smooth out the abrupt transitions in the stepped waveform to produce an audio signal closely resembling the original audio signal.

The bit storage capacity of ROM module 19 must be sufficient to record all of the spoken messages required by the talking book. Since this storage capacity is an important factor in the cost of the ROM module, data compression techniques may be used to reduce this cost.

The flat base inlet 20 of audio player AP is formed by parallel upper and lower plates. A spring contact inlet pad 21 is mounted at the underside of the upper plate at a position, as shown in FIGS. 5 and 6, to engage terminals 19T of the ROM module when the end margin of back cover 18 is inserted in the base inlet. As shown in FIG. 9, the contacts of inlet pad 21 connect the ROM module to the speech unit 22 of audio player AP.

This speech unit, when it is given the identification of the page P that is open to the reader, then functions to extract from the ROM module the message which corresponds to the printed text of the open page. Speech unit 22 is provided with a crystal-controlled oscillator including a crystal 23 that serves as a clock. The output of speech unit 22, which is a stepped audio signal waveform, is fed to a filter 24 which smoothes the waveform to produce an audio waveform which closely resembles the original audio waveform of the message. The output of filter 24 is applied to an audio amplifier 25 whose output is fed to a loudspeaker 26 so that the reader can hear aloud the text printed on the open page.

Mounted above inlet 20 in the case of audio player AP is a sensor array, generally designated by numeral 27, the position of the array being such as to pick up ambient light reflected from the bar code BC printed on the margin of the page of the book that is open to the reader. As shown in FIGS. 6 and 7, the sensor array includes an aperture plate 29 which is inclined 35 degrees with respect to the vertical axis, behind which is a mirror 30 to reflect light passing through the array of apertures to corresponding light sensors $S_1$ to $S_6$ mounted on a supporting pad 31.

The optical relationship of the elements of the bar code to sensors $S_1$ to $S_6$ is illustrated in FIG. 8, where the bar code shown by way of example is composed of a row of reflecting and non-reflecting elements, the first element being nonreflecting, causing no ambient light to be directed to sensor $S_1$ in the array. The second element is a space on the white paper and is therefore reflective, causing ambient light reflected thereby to be directed to sensor $S_2$. The third element is nonreflective; hence no light is picked up by sensor $S_3$. The fourth element is a reflective space, causing light to be directed toward sensor $S_4$. The fifth and sixth elements in the code are non-reflective, so that sensors $S_5$ and $S_6$ receive no light. Thus the binary signal yielded by sensors $S_1$ to $S_6$ in this example is 010100.

As shown in FIG. 9, sensors $S_1$ to $S_6$ in the array are connected to a sensor interface 32 which may take the form of a microprocessor that cooperates with speech unit 22 so that the page-identifying signal received by the interface is transferred to the speech unit which then reads out from ROM module 19 the recorded messages corresponding to the text on the open page whose identifying code is presented to the sensor array. Thus whenever a page of the book is turned to lie over the base inlet of the audio player to be viewed by the reader and by the sensor array, the audio player then picks up the identifying code of that page and reads aloud its printed text.

Player AP, as shown in FIG. 5, is provided with a row of button-actuated switches Br, Bq, BAa and BAb, all connected to speech unit 22, as shown in FIG. 9. When button Br is pressed by the reader, this causes the speech unit to again extract the messages from the ROM module which correspond to the printed text on the page then open to the reader. This feature is useful; for if the reader has found a particular text difficult to read, he may wish to hear it repeated aloud.

Button Bq is pressed by the reader after he has read and heard the printed text on the open page, and then wishes to read the question on the page related to the text, and have it read aloud to him. When button Bq is pressed, the speech unit 22 extracts from ROM 19 the digitized recording of the question on the identified page, which recording is decoded and reproduced in the manner previously described.

Now that the reader has read and heard the question, he must decide which of the two possible answers printed next to the printed question is correct. To assist him in making this choice, buttons BAa and BAb have colors which match the different ground colors of the two printed answers; hence the reader presses the button whose color corresponds to that of the answer he believes to be correct.

If the reader gives the wrong answer, the audio player then tells him that his answer is wrong and he should try again. But if the reader has correctly answered, the audio player then congratulates him on his correct answer and instructs him to turn to the next page in the book. It is not necessary or desirable to record messages in ROM 19 which give the audio player's response to the selected answers; for regardless of the subject matter of the book and the nature of the questions, the audio player will in all instances deliver the same spoken message to the effect that the answer is either right or wrong. Hence the "right" and "wrong" messages may be digitally recorded in a small capacity auxiliary ROM 33 incorporated in speech unit 22.

Since the assembly is intended primarily for children, many of whom may not be careful in the way they handle their playthings and books, in practice the assembly may include certain practical features to take this behavior into account. Because the operation of the assembly depends on ambient light to activate the sensor array, it has the advantage that no infrared or other light generators are required for page identification, for these consume power.

However, the child may sometimes try to read the book under poor ambient light conditions insufficient to activate sensors $S_1$ to $S_6$. Should sensor interface 32 fail to obtain adequate output signals from the sensors, it will then instruct the speech unit to extract from auxiliary ROM 33 a spoken message requesting the reader to read his book under a stronger light.

Power for the player is provided by a battery supply 34 which is connected to the various stages of the audio player by a power-up circuit 35 operated by a start switch 36. The arrangement is such that if the voltage output of the batteries is too low to operate the audio player, then the speech unit extracts from auxiliary ROM 33 a message instructing the reader to replace the batteries.

And the player preferably includes a timed shutdown circuit so that if after a predetermined interval the reader does not within this interval, say, two minutes, turn a page or take some other action indicating that he is making use of the talking book, the power to the player will automatically be cut off to conserve power.

While there has been shown and described a preferred embodiment of an interactive talking book and audio player assembly in accordance with the invention, it will be appreciated that many changes and modifications may be made therein without, however, departing from the essential spirit thereof. Thus instead of spoken answers which are given when the answer switches are closed, light or buzzer indications may be given.

Thus while in the foregoing description we have described the talking book and audio player assembly as providing spoken messages which correspond to the respective texts printed on the pages of the book, in practice in lieu of spoken messages or in addition thereto, one may store in the ROM module sound effects or background music appropriate to the text on each page.

For example, if a book in accordance with the invention tells the classic story of "Peter and the Wolf," in playback one may wish to include the sound effects and music which accompany this story in the well-known Prokofiev musical version of this story, thereby greatly enhancing the reader's enjoyment. In this context, whatever is played back (music, sound effects and words) is keyed to the page of the book that is open to be read.

It is important to note that playback is synchronized with the coded pages of the book and is therefore not necessarily in sequential order. If, for example, the book is open on page 3, and the reader then turns to page 7, pages 4 to 6 will not be played back, but only page 7. What is extracted from the ROM module is determined by the unique bar code on page 7 which is optically sensed by the audio player. Hence if the reader, after reading page 7, then turns back to page 5, what he will then hear is the spoken message (or other sounds) related to page 5 and no other page.

One may also provide a simplified version of the interactive talking book which dispenses with the bar code printed along the end margin of each page as well as the light sensor array on the audio player in optical relation to the bar code to produce a page identifying signal.

In this simplified version, each page has a conventional identifying number printed thereon, while the audio player is provided with an array of numbered push buttons similar to those found in a modern dial telephone. These buttons, when actuated, produce digital signals representing the numbers.

Thus if the book is open to page 5, the reader presses button 5 to produce digital signals that act to select from the ROM module the digitized spoken messages corresponding to the printed text on page 5. And if the book is open to page 12, the reader then presses buttons 1 and 2 to select the appropriate messages from the ROM module. In all other respects, the talking book including the interactive feature is similar to the book previously described.

I claim:

1. A talking book and audio player assembly comprising:
   A a book having a hard back cover and a plurality of pages, each carrying a printed text and a bar code printed along the end margin of the page formed by a series of light reflective and non-reflective elements that identify the page;
   B a ROM module secured to the end margin of the back cover and having exposed terminals, said module having stored therein a like plurality of digitized spoken messages, each message corresponding to the printed text on a respective page of the book; and
   C an audio player having a base inlet adapted to receive the end margin of the back cover, whereby when the pages thereof, when turned, overlie the inlet, the inlet being provided with inlet contacts that engage the terminals of the ROM module, and electronic means connected to the module through said inlet contacts to read out the digitized messages from the module and convert these messages into audio signals which are reproduced by a loudspeaker and heard by a reader as spoken messages, said audio player including a light sensor array which is laterally displaced from the bar code so as not to interfere with the pages overlying the inlet and is in operative optical relation to the bar code on the page then open to view to produce a page-identifying signal which effects selection for readout from the module of the digitized message corresponding to the printed text on the open page, the audio player being common to talking books of the same type but having different texts.

2. An assembly as set forth in claim 1, wherein each page of the book which carries a printed text has a drawing or picture thereon illustrating the text, whereby the reader not only hears the text read aloud but also sees the text illustrated, thereby enhancing the comprehension of the text.

3. An assembly as set forth in claim 1, wherein said electronic means includes a speech unit that converts the readout digitized message from the module into an audio signal having a stepped waveform which is applied to a filter which yields an audio signal closely resembling the original spoken messages.

4. An assembly as set forth in claim 3, wherein the output of the filter is applied through an audio amplifier to a loudspeaker.

5. An assembly as set forth in claim 4, wherein said sensors in the array are equal in number to the elements in the bar code, each sensor producing a binary signal that depends on whether the corresponding code element is reflective or non-reflective.

6. An assembly as set forth in claim 5, wherein the binary signals from the sensor array are applied to an interface which, on the basis of these signals, identifies the open page being viewed and transfers this page identification to the speech unit.

7. An assembly as set forth in claim 5, wherein said sensor array is constituted by an aperture plate mounted above the inlet at an angle to the open page to pass ambient light reflected from the elements of the bar code to a mirror which directs the light toward the respective sensors of the array.

8. An assembly as set forth in claim 5, wherein each page of the book having a printed text also has printed thereon a question relating to this text, said ROM module having stored therein a digitized spoken message corresponding to the printed question, where the question message is read out from the module when a reader operates a question switch connected to the speech unit.

9. An assembly as set forth in claim 7, wherein the page carrying the printed question also has printed thereon both a correct answer and a wrong answer thereto, said player having two answer switches connected to the speech unit whereby when the player selects and operates one of the answer switches, an indication is then given as to whether the selected answer is right or wrong.

10. An assembly as set forth in claim 9, wherein said answers are given in the form of spoken messages.

11. An assembly as set forth in claim 9, wherein said printed right and wrong answers on the page have different colors, and said answer switches are provided with button actuators having matching colors.

12. An interactive talking book and audio player assembly comprising:
   A a book having a hard back cover and a plurality of pages, each carrying a printed text, a bar code printed along the end margin of the page to identify the page, a printed question relating to the text, and at least two printed answers to the question, one of which is the right answer;
   B a ROM module secured to the end margin of the back cover and having exposed terminals, said module having stored therein a like plurality of digitized spoken text messages, each test message corresponding to the printed text on a respective page and digitized spoken question messages, each question message corresponding to the printed question on a respective page;
   C an audio player having a base inlet adapted to receive the end margin of the back cover whereby the pages thereof when turned overlie the inlet, the inlet being provided with inlet contacts that engage the terminals of the module, and electronic means connected to the module through said inlet contact to read out the digitized text and question messages from the ROM module and convert these messages into audio signals which are produced by a loudspeaker and heard by a reader as spoken messages, said audio player including means laterally displaced from the bar code so as not to interfere with the pages overlying the inlet and is in operative relation to the bar code to sense the code printed on the page then open to view to produce a page-identifying signal which effects selection for readout from the module of the message corresponding to the printed text on the open page, said player being provided with question and answer switches coupled to said electronic means whereby when the question switch is actuated, the question message stored by said module which corresponds to the printed question on the open page is then read out from the module, and when an answer switch is actuated, the audio player gives an indication whether the answer is the right answer, the audio player being common to interactive talking books of the same type but having different texts and questions and answers.

13. An assembly as set forth in claim 12, wherein when said answer switch is actuated, a spoken message is provided to indicate whether the answer to the question is correct.

14. An assembly as set forth in claim 12, wherein said means to sense the bar code is constituted by light sensors responsive to ambient light reflected from the bar code.

* * * * *

UNITED STATES PATENT OFFICE
CERTIFICATE OF CORRECTION

Patent No. 4,884,974            Dated December 5, 1989

Inventor(s) Eric DeSmet

It is certified that error appears in the above-identified patent and that said Letters Patent is hereby corrected as shown below:

Column 10, line 34, "where" should read --wherein--.

Column 10, line 62, "test" should read --text--.

Signed and Sealed this

Twentieth Day of November, 1990

*Attest:*

HARRY F. MANBECK, JR.

*Attesting Officer*      *Commissioner of Patents and Trademarks*